US012574900B2

(12) United States Patent
Gerami et al.

(10) Patent No.: US 12,574,900 B2
(45) Date of Patent: Mar. 10, 2026

(54) SPECTRUM EFFICIENCY IN CONFIGURED GRANT

(71) Applicant: Telefonaktiebolaget LM Ericsson (publ), Stockholm (SE)

(72) Inventors: Majid Gerami, Lund (SE); Min Wang, Luleå (SE); Bikramjit Singh, Raasepori (FI); Jan Christoffersson, Luleå (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 496 days.

(21) Appl. No.: 18/001,959

(22) PCT Filed: Jun. 17, 2021

(86) PCT No.: PCT/EP2021/066334
§ 371 (c)(1),
(2) Date: Dec. 15, 2022

(87) PCT Pub. No.: WO2021/255136
PCT Pub. Date: Dec. 23, 2021

(65) Prior Publication Data
US 2023/0232371 A1       Jul. 20, 2023

Related U.S. Application Data

(60) Provisional application No. 63/041,540, filed on Jun. 19, 2020.

(51) Int. Cl.
*H04W 72/02*       (2009.01)
*H04W 72/12*       (2023.01)
*H04W 72/20*       (2023.01)

(52) U.S. Cl.
CPC ........... *H04W 72/02* (2013.01); *H04W 72/12* (2013.01); *H04W 72/20* (2023.01)

(58) Field of Classification Search
CPC ...... H04W 72/02; H04W 72/12; H04W 72/20
See application file for complete search history.

(56) References Cited

U.S. PATENT DOCUMENTS

| | | | | |
|---|---|---|---|---|
| 11,546,881 B2 * | 1/2023 | Sarkis | ................... | H04W 72/02 |
| 11,758,481 B2 * | 9/2023 | Ding | ..................... | H04L 1/1812 370/311 |

(Continued)

FOREIGN PATENT DOCUMENTS

| | | |
|---|---|---|
| CA | 3114600 A1 | 4/2020 |
| WO | 2019/160967 A1 | 8/2019 |

OTHER PUBLICATIONS

International Search Report issued in International Application No. PCT/EP2021/066334, dated Sep. 30, 2021 (3 pages).

(Continued)

*Primary Examiner* — Eunsook Choi
(74) *Attorney, Agent, or Firm* — Sage Patent Group

(57)       ABSTRACT

The invention refers to a method (400) performed by a secondary user equipment, UE, the method comprising determining (s402) a transmission activity of a primary UE on a configured grant, CG, resource that is shared by the primary UE and the secondary UE; and transmitting data (s404) on the CG resource after determining that the primary UE will not transmit or is not transmitting data on the CG; the invention further refers to a corresponding user equipment.

14 Claims, 9 Drawing Sheets

UE1 transmits                    UE1 does not have data in buffer to transmit

(56)                    References Cited

U.S. PATENT DOCUMENTS

| | | | | |
|---|---|---|---|---|
| 12,108,367 B2 * | 10/2024 | Sartori | ................. | H04W 76/14 |
| 12,120,063 B2 * | 10/2024 | Fan | ....................... | H04W 72/20 |
| 12,120,643 B2 * | 10/2024 | Zhao | ................ | H04W 72/0446 |
| 12,256,253 B2 * | 3/2025 | Sarkis | ................... | H04W 72/02 |
| 2020/0383088 A1 * | 12/2020 | Min | ................. | H04W 72/0453 |
| 2021/0352679 A1 * | 11/2021 | Baghel | ................... | H04W 4/40 |
| 2022/0263613 A1 * | 8/2022 | Fan | ........................ | H04L 5/006 |

OTHER PUBLICATIONS

Ericsson, 3GPP TSG-RAN WG1 Meeting #98, R1-1909797 "Feature lead summary#2 on Resource allocation for NR sidelink Mode 1", 3rd Generation Partnership Project (3GPP), Prague, CZ, Aug. 2019 (34 pages).
Institute for Information Industry (III), 3GPP TSG RAN WG1 Ad-Hoc Meeting 1901; R1-1901099, "Discussion UL Inter UE Tx multiplexing", 3rd Generation Partnership Project (3GPP), Taipei, Taiwan, Jan. 2019 (5 pages).
Samsung, 3GPP TSG-RAN2 Meeting #109bis-e; R2-2004289, "Correction for NR IIOT in 38.321", 3rd Generation Partnership Project (3GPP), Electronic, Apr. 2020 (20 pages).

* cited by examiner

400 s402 determining that a primary user equipment (UE) will not transmit or is not transmitting data on a configured grant (CG) resource that is shared by the primary UE and the secondary UE s404 transmitting data on the CG resource if the primary UE will not transmit or is not transmitting data on the CG 302b

700 s702 configuring a primary user equipment (UE) with uplink configured grant (CG) for uplink transmission on a CG resource s704 configuring a secondary UE with uplink CG for uplink transmission on the CG resource

SPECTRUM EFFICIENCY IN CONFIGURED GRANT

CROSS REFERENCE TO RELATED APPLICATION

This application is a 35 U.S.C. § 371 National Phase Entry Application from PCT/EP2021/066334, filed Jun. 17, 2021, designating the United States, which claims priority to U.S. provisional patent application No. 63/041,540, filed Jun. 19, 2020, the disclosures of which are incorporated herein by reference in their entirety.

TECHNICAL FIELD

This disclosure relates to apparatuses, methods, and systems for a configured grant (CG) resource that is shared by the primary UE and the secondary UE. Some aspects of this disclosure relate to the secondary UE transmit data on the CG resource if the primary UE will not transmit or is not transmitting data on the CG.

BACKGROUND 1.1. Beam-Forming Centric Transmission for NR Operation in Mm-Wave Frequency As the operating frequency of wireless networks increases and moves to millimeter wave territory, data transmission between nodes suffers from high propagation loss, which is proportional to the square of the carrier frequency. Moreover, the millimeter wave signal also suffers from high oxygen absorption, high penetration loss and a variety of blockage problems. On the other hand, with the wavelength as small as less than a centimeter, it becomes possible to pack a large amount (tens, hundreds or even thousands) of antenna elements into a single antenna array with a compact form factor, which can be widely adopted in a network equipment and a user device. Such antenna arrays/panels can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands. In addition, a transmitter/receiver can typically only transmit/receive in one or perhaps a few directions at any given time.

1.1.1. Spatial Relations for PUSCH Using Configured Grants

Two types of configured grant (CG) uplink (UL) transmission schemes have been supported in New Radio (NR) (a.k.a., 5G or Next Generation (NG)) since Rel-15. The two types of CG transmission are referred as CG Type1 and CG Type2 in the standard. The major difference between these two types of CG transmission is that, for CG Type1, an uplink grant is provided by Radio Resource Control (RRC) configuration and activated automatically, and, for CG Type2, the uplink grant is provided and activated via L1 signaling (e.g., by an UL Downlink Control Information (DCI) with cyclic redundancy check (CRC) scrambled by Configured Scheduling-Radio Network Temporary Identifier (CS-RNTI)). In both cases, the spatial relation used for physical uplink shared channel (PUSCH) transmission with Configured Grant is indicated by the uplink grant, either provided by the RRC configuration or by an UL DCI. The uplink grant contains an srs-ResourceIndicator field that points to one of the Sounding Reference Signal (SRS) resources in the SRS resource configuration, which can be configured in-turn with a spatial relation to a downlink (DL) reference signal (RS) (e.g., Synchronization Signal Block (SSB) or Channel State Information Reference Signal (CSI-RS)) or another SRS resource.

With the SRS resource indicator in the uplink grant and the RRC SRS resource configuration, PUSCH with Configured Grant is supposed to be transmitted with the same precoder or beamforming weights as the one used for the transmission of the reference SRS.

1.2. Configured Scheduling in NR Rel-15

In NR, configured scheduling is used to allocate semi-static periodic assignments or grants for a user equipment (UE). For uplink, there are two types of configured scheduling schemes: Type 1 and Type 2. For Type 1, configured grants are configured via RRC signaling only. For Type 2, a configuration procedure similar to Semi Persistent Scheduling (SPS) UL in Long Term Evolution (LTE) was defined (i.e., some parameters are preconfigured via RRC signaling and some physical layer parameters are configured via media access control (MAC) scheduling procedure. The detail procedures can be found in 3GPP TS 38.321 clause 5.8.2.

Similar to SPS in LTE, the CG periodicity is RRC configured, and this is specified in the ConfiguredGrantConfig IE. Different periodicity values are supported in NR depending on the subcarrier spacing. For example, for 15 and 30 kHz SCS, the following periodicities are supported, expressed in a number of orthogonal frequency multiplexing (OFDM) symbols:

15 kHz SCS 2, 7, and n*14 OFDM symbols where $n \in \{1, 2, 4, 5, 8, 10, 16, 20, 32, 40, 64, 80, 128, 160, 320, 640\}$ 30 kHz SCS 2, 7, and n*14 OFDM symbols where $n \in \{1, 2, 4, 5, 8, 10, 16, 20, 32, 40, 64, 80, 128, 160, 256, 320, 640, 1280\}$ For Type1 configured grants, in addition to the periodicity, the time domain allocation of PUSCH is configured purely via RRC signalling:

timeDomainOffset: Provides a slot offset with respect to single-frequency network (SFN) 0 timeDomainAllocation: Provides an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For the case of Type2 configured grants, the periodicity is configured by RRC in the same way as for Type1, but the slot offset is dynamically indicated and is given by the slot in which the UE receives the DCI that activates the Type2 configured grant. In contrast to Type1, the time domain allocation of PUSCH is indicated dynamically by DCI via the time domain resource assignment field in the same way as for scheduled (non-CG) PUSCH. This DCI field indexes a table of start symbol and length (SLIV) values.

A configuredGrantTimer (CGT) is introduced to prevent the occurrence of both of the following cases:

1) a configured grant to override a transport block (TB) scheduled with a dynamic grant (i.e., new transmission or retransmission)

2) a configured grant to override an initial TB with another configured grant (i.e., new transmission)

Meanwhile, there is no explicit Hybrid Automatic Repeat Request (HARQ) A/N in Rel-15. The NG NodeB (gNB)

signals a grant indicating a new transmission to the UE which can inexplicitly indicate "ACK".

The CGT is started/restarted for a HARQ process which is configured for a configured grant, upon transmission on PUSCH with a dynamic grant (i.e., new transmission or retransmission) or a configured grant (i.e., new transmission). It is stopped when either of below cases occur:

1) the UE has received a PDCCH indicating configured grant Type 2 activation.

2) the corresponding HARQ process has been ACKed (i.e., a grant indicating a new transmission for the associated HARQ process).

Its expiration means ACK for the associated HARQ process.

1.3. Configured Scheduling in NR Rel-16

The detailed configuration details of the RRC spec (i.e., 3GPP TS 38.331) for configured grant in NR Rel-16 is illustrated as below:

```
-- ASN1START
-- TAG-CONFIGUREDGRANTCONFIG-START
ConfiguredGrantConfig ::=                    SEQUENCE {
    frequencyHopping                         ENUMERATED {intraSlot, interSlot}   OPTIONAL, -- Need S
    cg-DMRS-Configuration                    DMRS-UplinkConfig,
    mcs-Table                    ENUMERATED {qam256, qam64LowSE}   OPTIONAL, -- Need S
    mcs-TableTransformPrecoder                        ENUMERATED {qam256, qam64LowSE}   OPTIONAL, -- Need S
    uci-OnPUSCH                               SetupRelease { CG-UCI-OnPUSCH}   OPTIONAL, -- Need M
    resourceAllocation                        ENUMERATED { resourceAllocationType0, resourceAllocationType1, dynamicSwitch },
    rbg-Size                     ENUMERATED {config2}   OPTIONAL, -- Need S
    powerControlLoopToUse                     ENUMERATED {n0, n1},
    p0-PUSCH-Alpha                            P0-PUSCH-AlphaSetId,
    transformPrecoder                         ENUMERATED {enabled, disabled}   OPTIONAL, -- Need S
    nrofHARQ-Processes                        INTEGER(1..16),
    repK                         ENUMERATED {n1, n2, n4, n8},
    repK-RV                      ENUMERATED {s1-0231, s2-0303, s3-0000}   OPTIONAL, -- Need R
    periodicity                  ENUMERATED {
                sym2, sym7, sym1x14, sym2x14, sym4x14, sym5x14, sym8x14, sym10x14, sym16x14, sym20x14,sym32x14,
sym40x14, sym64x14, sym80x14, sym128x14, sym160x14, sym256x14, sym320x14, sym512x14,sym640x14, sym1024x14, sym1280x14,
sym2560x14, sym5120x14, sym6, sym1x12, sym2x12, sym4x12, sym5x12, sym8x12, sym10x12, sym16x12, sym20x12,sym32x12,
sym40x12, sym64x12, sym80x12, sym128x12, sym160x12, sym256x12, sym320x12, sym512x12, sym640x12,sym1280x12, sym2560x12 },
    configuredGrantTimer                      INTEGER (1..64)   OPTIONAL, -- Need R
    rrc-ConfiguredUplinkGrant                 SEQUENCE {
        timeDomainOffset                      INTEGER (0..5119),
        timeDomainAllocation                  INTEGER (0..15),
        frequencyDomainAllocation             BIT STRING (SIZE(18)),
        antennaPort                 INTEGER (0..31),
        dmrs-SeqInitialization                INTEGER (0..1)   OPTIONAL, -- Need R
        precodingAndNumberOfLayers                 INTEGER (0..63),
        srs-ResourceIndicator                 INTEGER (0..15)   OPTIONAL, -- Need R
        mcsAndTBS                             INTEGER (0..31),
        frequencyHoppingOffset                 INTEGER (1.. maxNrofPhysicalResourceBlocks-1)   OPTIONAL, -- Need R
        pathlossReferenceIndex                 INTEGER (0..maxNrofPUSCH-PathlossReferenceRSs-1),
        ...,
        [[
        pusch-RepTypeIndicator-r16                        ENUMERATED {pusch-RepTypeA,pusch-RepTypeB}   OPTIONAL, -- Need M
        frequencyHoppingPUSCH-RepTypeB-r16 ENUMERATED {interRepetition, interSlot}   OPTIONAL, -- Cond RepTypeB
        timeReferenceSFN-r16                  ENUMERATED {sfn512}   OPTIONAL -- Need R
        ]]
    }                                         OPTIONAL, -- Need R
    ...,
    [[
    cg-RetransmissionTimer-r16                    INTEGER (1..64)   OPTIONAL, -- Need R
    cg-minDFI-Delay-r16                       INTEGER (1..ffsValue)   OPTIONAL, -- Need R Upper limit 7 FFS
    cg-nrofPUSCH-InSlot-r16                   INTEGER (1..ffsValue)   OPTIONAL, -- Need R
    cg-nrofSlots-r16                  INTEGER (1..ffsValue)   OPTIONAL, -- Need R
    cg-StartingFullBW-InsideCOT-r16               ENUMERATED {ffs}   OPTIONAL, -- Need R
    cg-StartingFullBW-OutsideCOT-r16               ENUMERATED {ffs}   OPTIONAL, -- Need R
    cg-StartingPartialBW-InsideCOT-r16             ENUMERATED {ffs}   OPTIONAL, -- Need R
    cg-StartingPartialBW-OutsideCOT-r16            ENUMERATED {ffs}   OPTIONAL, -- Need R
    cg-UCI-Multiplexing                  ENUMERATED {enabled}   OPTIONAL, -- Need R
    cg-COT-SharingOffset-r16                  INTEGER (1..ffsValue)   OPTIONAL, -- Need R
    betaOffsetCG-UCI-r16                      INTEGER (1..ffsValue)   OPTIONAL, -- Need R
    cg-COT-SharingList-r16                    SEQUENCE (SIZE (1..ffsValue)) OF CG-COT-Sharing-r16   OPTIONAL, -- Need R
    harq-ProcID-Offset-r16                    INTEGER (0..15)   OPTIONAL, -- Need M
    harq-ProcID-Offset2-r16                   INTEGER (0..15)   OPTIONAL, -- Need M
    configuredGrantConfigIndex-r16                ConfiguredGrantConfigIndex-r16   OPTIONAL, -- Need M
    configuredGrantConfigIndexMAC-r16                 ConfiguredGrantConfigIndexMAC-r16   OPTIONAL, -- Need M
    periodicityExt-r16                  INTEGER (1..5120)   OPTIONAL, -- Need M
    startingFromRV0-r16                       ENUMERATED {on, off}   OPTIONAL, -- Need M
    phy-PriorityIndex-r16                ENUMERATED {p0, p1}   OPTIONAL, -- Need M
    autonomousReTx-r16                        ENUMERATED {enabled}   OPTIONAL -- Cond LCH-BasedPrioritization
    ]]
}
```

Compared to the Configured grant in NR Rel-15 specifications, a UE can trigger a retransmission autonomously using a configured grant for a HARQ process configured with autonomous uplink (AUL) when the CG retransmission timer is expired while the UE has not received HARQ feedback for the HARQ process. A timer "CG retransmission timer (CGRT)" is defined accordingly. This timer is configured by the RRC parameter cg-Retransmission Timer in the ConfiguredGrantConfig. The CGRT is started for a HARQ process configured with AUL upon the data transmission using a configured grant, and a retransmission using another configured grant is triggered when the CGRT expires.

With this added functionality, it is beneficial for the UE to avoid the HARQ process to be stalled in case the gNB has missed the HARQ transmission initiated by the UE. However, an issue is observed that a UE may just continuously initiate autonomous HARQ retransmissions for a HARQ process for a very long time. However, the gNB may not successfully receive the TB either due to bad radio channel quality or the channel is seldom obtained due to LBT failures. This is certainly not desirable because the packet may become too old and any retransmission attempt would just further congest the channel and further affect the latency of other packets in the UL buffer. The RLC layer at the UE may sooner or later trigger RLC retransmissions for a RLC PDU which is still under retransmissions in the HARQ. The retransmitted RLC PDU would occupy a different HARQ process. In this case, the UE would then maintain two HARQ processes in transmission for the same RLC PDU. The RLC receiver at the gNB may receive two RLC PDU duplicates. This may create a trouble in case a wraparound of the RLC sequence number occurs. The second received RLC PDU may be treated as a new data and forwarded upward instead the PDU should be dropped.

Therefore, it is necessary to introduce a maximum limit on AUL retransmissions of a HARQ process triggered by a UE. To address this issue, a timer is configured to indicate the maximum amount of time for the UE to complete transmission of an HARQ process, i.e. when the timer expires the UE should flush the HARQ buffer for this HARQ process and transmit new data associated to it. It has been agreed to use an existing timer configuredGrantTimer (CGT) for this purpose. If both CGT and CG retransmission timer (CGRT) are configured for a HARQ process, both timers can be operated in parallel. In this way, the UE can perform HARQ retransmission using CG resources for a HARQ process while CGT is running for the process. The value of CGT should be longer than that of CG retransmission timer. The HARQ buffer is flushed at expiry of CGT. An example of the procedure is illustrated in FIG. 1.

A UE can be provided with multiple active configured grants for a given bandwidth part (BWP) in a serving cell. The introduction of multiple configured grants would serve at least for enhancing reliability and reducing latency of critical services. In addition, applying multiple configured grants for allowing the UE to switch to slot-based transmissions after initiating the COT (channel occupancy time) to minimize Demodulation Reference Signal (DMRS) and Uplink Control Information (UCI) overhead in unlicensed spectrum is being discussed.

For each CG configuration, there are a number of HARQ processes in the HARQ process pool assigned. There is also a separate CGT timer and CGRT setting associated with each CG configuration. Sharing HARQ processes between CG configurations is allowed, which can give better configuration flexibility. In addition, if each CG configuration has separate associated HARQ processes, the HARQ process space may become limited for the UE.

Because a logical channel (LCH) can be mapped to multiple CG configurations, the UE can transmit the data of the LCH using multiple active CG resources at the same time. For a TB which was transmitted using a CG resource, it is allowed to use any CG resource among the set of CG resources mapped to the LCH which comes earliest in the time to perform retransmission, this can reduce the latency. In addition, the selected resource shall provide same size as the same initial TB to avoid rate-matching on the TB. In addition, the UE shall stick to the same HARQ process for transmission/retransmission of a TB.

The CGT timer for a HARQ process shall be only started when the TB using this HARQ process is initially transmitted. The value of the CGT timer is set according to the CG configuration/resource which is used for the initial transmission. In parallel, the CGRT shall be started/restarted and set to the timer value which is used for every transmission/retransmission attempt. If the initial transmission of a TB uses the resource in CG configuration 1, the CGRT is started using the timer value configured in CG configuration 1. The next retransmission of the TB is performed with the resource in CG configuration 2. The CGRT needs to be restarted and set to the timer value configured in CG configuration 2.

The HARQ process number field in the UL DCI (e.g., format 0-0 or format 0-1) scrambled by CS-RNTI is used to indicate which configuration is to be activated and which configuration(s) is/are to be released. In the DCI, the new data indicator (NDI) in the received HARQ information is 0.

Upon reception of an activation/reactivation/deactivation command, the UE provides a confirmation MAC CE to the gNB. The MAC CE contains a bitmap of CG configurations. In the bitmap field, each bit corresponds to a specific CG configuration (i.e., the bit position corresponds to the CG index).

1.4. Configured Grant with Repetition

Repetition of a TB is also supported in NR, and the same resource configuration is used for K repetitions for a TB including the initial transmission. The higher layer configured parameters repK and repK-RV define the K repetitions to be applied to the transmitted transport block, and the redundancy version pattern to be applied to the repetitions. For the nth transmission occasion among K repetitions, n=1, 2, . . . , K, it is associated with (mod(n−1,4)+1)th value in the configured RV sequence. The initial transmission of a transport block may start at (i) the first transmission occasion of the K repetitions if the configured RV sequence is {0,2,3,1}, (ii) any of the transmission occasions of the K repetitions that are associated with RV=0 if the configured RV sequence is {0,3,0,3}, or (iii) any of the transmission occasions of the K repetitions if the configured RV sequence is {0,0,0,0}, except the last transmission occasion when K=8.

For any RV sequence, the repetitions shall be terminated after transmitting K repetitions, or at the last transmission occasion among the K repetitions within the period P, or when a UL grant for scheduling the same TB is received within the period P, whichever is reached first. The UE is not expected to be configured with the time duration for the transmission of K repetitions larger than the time duration derived by the periodicity P.

For both Type 1 and Type 2 PUSCH transmissions with a configured grant, when the UE is configured with repK>1, the UE shall repeat the TB across the repK consecutive slots applying the same symbol allocation in each slot. If the UE procedure for determining slot configuration, as defined in subclause 11.1 of TS 38.213, determines symbols of a slot allocated for PUSCH as downlink symbols, the transmission on that slot is omitted for multi-slot PUSCH transmission.

1.5. Skipping Uplink Transmission

There is a skipUplinkTxDynamic parameter such that, if it is set to TRUE, then the UE skips uplink configured grant transmission (if there is no data in the UE's buffer).

According to TS 38.331 Version 16.0, Section 6.3.2:
The IE MAC-CellGroupConfig is used to configure MAC parameters for a cell group, including DRX.
MAC-CellGroupConfig Information Element there is no aperiodic CSI requested for this PUSCH transmission as specified in TS 38.212; and the MAC PDU includes zero MAC SDUs; and the MAC PDU includes only the periodic BSR and there is no data available for any LCG, or the MAC PDU includes only the padding BSR."

For a UE that is configured with uplink configured grant, the configured resources are available periodically, and the UE transmits using given resources whenever the UE has

```
-- ASN1START
-- TAG-MAC-CELLGROUPCONFIG-START
MAC-CellGroupConfig ::=                 SEQUENCE {
    drx-Config              SetupRelease { DRX-Config }              OPTIONAL, -- Need M
    schedulingRequestConfig                 SchedulingRequestConfig              OPTIONAL, -- Need M
    bsr-Config              BSR-Config              OPTIONAL, -- Need M
    tag-Config              TAG-Config              OPTIONAL, -- Need M
    phr-Config              SetupRelease { PHR-Config }              OPTIONAL, -- Need M
    skipUplinkTxDynamic                 BOOLEAN,
    ...,
    [[
    csi-Mask                 BOOLEAN           OPTIONAL, -- Need M
    dataInactivityTimer                 SetupRelease { DataInactivityTimer }     OPTIONAL -- Cond MCG-Only
    ]],
    [[
    usePreBSR-r16                 ENUMERATED {true}           OPTIONAL, -- Need M
    lbt-FailureRecoveryConfig-r16                 LBT-FailureRecoveryConfig-r16           OPTIONAL, -- Need M
    schedulingRequestID-LBT-SCell-r16 SchedulingRequestId                 OPTIONAL, -- Need M
    lch-BasedPrioritization-r16                 ENUMERATED {enabled}           OPTIONAL, -- Need R
    schedulingRequestID-BFR-SCell-r16 SchedulingRequestId                 OPTIONAL -- Need R
    ]]
}
DataInactivityTimer ::= ENUMERATED {s1, s2, s3, s5, s7, s10, s15, s20, s40, s50, s60, s80, s100, s120, s150, s180}
-- TAG-MAC-CELLGROUPCONFIG-STOP
-- ASN1STOP
```

MAC-CellGroupConfig field descriptions usePreBSR
If set to true, the MAC entity of the IAB-MT will activate the pre-BSR.
csi-Mask
If set to true, the UE limits CSI reports to the on-duration period of the DRX cycle, see TS 38.321 [3].
dataInactivityTimer
Releases the RRC connection upon data inactivity as specified in clause 5.3.8.5 and in TS 38.321 [3]. Value s1 corresponds to 1 second, value s2 corresponds to 2 seconds, and so on.
drx-Config
Used to configure DRX as specified in TS 38.321 [3].
lch-BasedPrioritization
If this field is present, the UE is configured with prioritization between overlapping grants and between scheduling request and overlapping grants based on LCH priority, see see TS 38.321 [3].
    Editor's Note: It is FFS whether SR/data prioritization can be a separate configurable parameter from data/data prioritization.
schedulingRequestID-BFR-SCell
If present, it indicates the scheduling request configuration applicable for BFR on SCell, as specified in TS 38.321 [3].
schedulingRequestID-LBT-SCell
Indicates the scheduling request configuration applicable for consistent uplink LBT recovery on SCell, as specified in TS 38.321 [3].
skipUplinkTxDynamic
If set to true, the UE skips UL transmissions as described in TS 38.321 [3].

According TS 38.221 Version 16.0.0 Section 5.4.3: "The MAC entity shall not generate a MAC PDU for the HARQ entity if the following conditions are satisfied:

the MAC entity is configured with skipUplinkTxDynamic with value true and the grant indicated to the HARQ entity was addressed to a C-RNTI, or the grant indicated to the HARQ entity is a configured uplink grant; and data in its buffer to be transmitted. However, a UE configured with uplink configured grant may not always have data to transmit. In this case, those reserved resources are not being used. This is shown in FIG. 2, where UE1 is configured for periodicity P=4 slots, and UE1 transmits in the first transmission occasion (TO), but the UE does not have data to transmit in the second TO.

SUMMARY

When a UE that is configured with uplink configured grant does not have data to transmit using reserved resources, the reserved resources are not used, and the spectral efficiency of the system is reduced. Aspects of the invention may overcome this problem by exploiting more efficiently the radio resources when a UE skips an uplink transmission. Thus, aspects of the invention may improve spectral efficiency.

One aspect of the invention may provide a method performed by a secondary user equipment (UE). The method may include determining that a primary UE will not transmit or is not transmitting data on a configured grant (CG) resource that is shared by the primary UE and the secondary UE. The method may include transmitting data on the CG resource if the primary UE will not transmit or is not transmitting data on the CG.

In some aspects, determining that the primary UE will not transmit or is not transmitting data on the CG resource may include determining that the primary UE is not transmitting data on the CG resource. In some aspects, determining that the primary UE is not transmitting data on the CG resource may include sensing no activity on the CG resource. In some aspects, determining that the primary UE is not transmitting data on the CG resource may include performing listen before transmission or clear channel assessment.

In some aspects, transmitting data on the CG resource may include transmitting data on only a portion of the CG resource. In some aspects, the portion of the CG resource may be a remaining portion of the CG resource that was not used in determining that the primary UE is not transmitting data on the CG resource. In some aspects, the timing of the start of transmitting the data on the CG resource may be offset from the timing of the start of the CG resource. In some aspects, determining that the primary UE is not transmitting data on the CG resource may include using an orthogonal frequency multiplexing (OFDM) symbol or a portion of an OFDM symbol reserved for determining that the primary UE is not transmitting data on the CG resource. In some aspects, transmitting data on the CG resource may include performing rate matching around symbols used for determining that the primary UE is not transmitting data on the CG resource.

In some aspects, the secondary UE may apply a different mapping type than the primary UE. In some aspects, the secondary UE may be allocated with a physical uplink shared channel (PUSCH) that has a shorter duration than the PUSCH with which the primary UE is allocated.

In some aspects, the secondary UE may be configured with a maximum resource occupancy time. In some aspects, the method may further include stopping transmitting the data on the CG resource to release the CG resource if a collision between the primary UE and the secondary UE occurs.

In some aspects, determining that the primary UE is not transmitting data on the CG resource may include sensing no activity on a first symbol, and transmitting data on the CG resource comprises starting transmitting data from a second symbol if no activity is sensed on the first symbol. In some aspects, determining that the primary UE is not transmitting data on the CG resource may include sensing no activity on a first symbol, the method further includes sensing no activity on a second symbol, and transmitting data on the CG resource may include starting transmitting data from a third symbol if no activity is sensed on the first and second symbols. In some aspects, the primary UE may have a highest priority, the secondary UE may have an nth highest priority, the method may include sensing no activity on a first n−1 symbols, and transmitting data on the CG resource may include starting transmitting data from an nth symbol if no activity is sensed on the first n−1 symbols.

In some aspects, the method may further include sensing no activity on the CG resource and introducing a gap between sensing no activity on the CG resource and transmitting data on the CG resource. In some aspects, determining that the primary UE is not transmitting data on the CG resource may include sensing no activity on a first symbol, transmitting data on the CG resource may include starting transmitting data from a kth symbol if no activity is sensed on the first symbol, and k may be an integer greater than 2. In some aspects, the method may include sensing no activity on a first k symbols, transmitting data on the CG resource may include starting transmitting data from a 2*kth symbol if no activity is sensed on the first k symbols, and k may be an integer greater than 1. In some aspects, the primary UE may have a highest priority, the secondary UE may have an nth highest priority, the method may include sensing no activity on a first (n−1)*k symbols, transmitting data on the CG resource may include starting transmitting data from an n*kth symbol if no activity is sensed on the first (n−1)*k symbols, and k may be an integer greater than 1.

In some aspects, determining that the primary UE will not transmit or is not transmitting data on the CG resource may include determining that the primary UE will not transmit data on the CG resource. In some aspects, determining that the primary UE will not transmit data on the CG resource may include communicating with the primary UE. In some aspects, determining that the primary UE will not transmit data on the CG resource may include performing handshaking and/or negotiations with the primary UE. In some aspects, determining that the primary UE will not transmit data on the CG resource may include asking the primary UE for permission to transmit data on the CG resource in the next transmission occasion (TO). In some aspects, determining that the primary UE will not transmit data on the CG resource may further include receiving from the primary UE permission to transmit data on the CG resource in the next TO.

In some aspects, determining that the primary UE will not transmit data on the CG resource may include receiving from the primary UE an indication that the primary UE will not transmit data on the CG resource in the next transmission occasion (TO). In some aspects, the indication that the primary UE will not transmit data on the CG resource in the next TO may be a buffer status report. In some aspects, the indication that the primary UE will not transmit data on the CG resource in the next TO may be received as part of a broadcast or a multicast from the primary UE. In some aspects, the indication that the primary UE will not transmit data on the CG resource in the next TO may indicate that the CG resource will not be occupied by the primary UE for a certain time.

In some aspects, determining that the primary UE will not transmit data on the CG resource may include monitoring a physical uplink control channel (PUCCH) resource configured for scheduling request (SR) transmission (SR-PUCCH resource) and determining that the primary UE has not transmitted an SR. In some aspects, the method may further include determining that no other secondary UE having a priority higher than the priority of the secondary UE has transmitted an SR. In some aspects, the method may further include transmitting an SR prior to transmitting data on the CG resource.

Another aspect of the invention may provide a secondary user equipment (UE) adapted to determine that a primary UE will not transmit or is not transmitting data on a configured grant (CG) resource that is shared by the primary UE and the secondary UE. The secondary UE may be further adapted to transmit data on the CG resource if the primary UE will not transmit or is not transmitting data on the CG.

In some aspects, the secondary UE, to determine that the primary UE will not transmit or is not transmitting data on the CG resource, may be adapted to determine that the primary UE will not transmit data on the CG resource. In some aspects, the secondary UE, to determine that the primary UE will not transmit data on the CG resource, may be adapted to communicate with the primary UE. In some aspects, the secondary UE, to determine that the primary UE will not transmit data on the CG resource, may be adapted to perform handshaking and/or negotiations with the primary UE.

In some aspects, the secondary UE, to determine that the primary UE will not transmit data on the CG resource, may be adapted to ask the primary UE for permission to transmit data on the CG resource in the next transmission occasion (TO). In some aspects, the secondary UE, to determine that the primary UE will not transmit data on the CG resource, may be further adapted to receive from the primary UE permission to transmit data on the CG resource in the next TO.

In some aspects, the secondary UE, to determine that the primary UE will not transmit data on the CG resource, may be adapted to receive from the primary UE an indication that the primary UE will not transmit data on the CG resource in the next transmission occasion (TO). In some aspects, the indication that the primary UE will not transmit data on the CG resource in the next TO may be a buffer status report. In some aspects, the indication that the primary UE will not transmit data on the CG resource in the next TO may be received as part of a broadcast or a multicast from the primary UE. In some aspects, the indication that the primary UE will not transmit data on the CG resource in the next TO may indicate that the CG resource will not be occupied by the primary UE for a certain time.

In some aspects, the secondary UE, to determine that the primary UE will not transmit data on the CG resource, may be adapted to: monitor a physical uplink control channel (PUCCH) resource configured for scheduling request (SR) transmission (SR-PUCCH resource); and determine that the primary UE has not transmitted an SR. In some aspects, the secondary UE may be further adapted to determine that no other secondary UE having a priority higher than the priority of the secondary UE has transmitted an SR.

In some aspects, the secondary UE is further adapted to transmit an SR prior to transmitting data on the CG resource.

In some aspects, the secondary UE, to determine that the primary UE will not transmit or is not transmitting data on the CG resource, may be adapted to determine that the primary UE is not transmitting data on the CG resource. In some aspects, the secondary UE, to determine that the primary UE is not transmitting data on the CG resource, may be adapted to sense no activity on the CG resource. In some aspects, the secondary UE, to determine that the primary UE is not transmitting data on the CG resource, may be adapted to perform listen before transmission or clear channel assessment.

Yet another aspect of the invention may provide a method performed by a network node. The method may include configuring a primary user equipment (UE) with uplink configured grant (CG) for uplink transmission on a CG resource. The method may include configuring a secondary UE with uplink CG for uplink transmission on the CG resource.

In some aspects, the method may further include receiving data transmitted on the CG resource and determining which of the primary UE and secondary UE transmitted the data. In some aspects, determining which of the primary UE and secondary UE transmitted the data may include using a demodulation reference signal (DMRS) sequence. In some aspects, determining which of the primary UE and secondary UE transmitted the data may include using configured grant uplink control information (CG-UCI). In some aspects, the CG-UCI may include a field indicating information or an identity of the UE that transmitted the data. In some aspects, determining which of the primary UE and secondary UE transmitted the data may include using a transmission timing offset.

In some aspects, the method may further include configuring multiple secondary UEs (302b) with uplink CG for uplink transmission on the CG resource, each secondary UE may be configured with a different transmission timing offset, the method may further include receiving data transmitted on the CG resource, and the method may further include determining which of the multiple secondary UEs transmitted the data using a transmission timing offset of the received data.

In some aspects, the method may further include allocating the secondary UE with a physical uplink shared channel (PUSCH) having a shorter duration than the PUSCH with which the primary UE is allocated.

In some aspects, the method may further include configuring the primary UE to only transmit data starting from a first symbol. In some aspects, the method may further include configuring the secondary UE to only transmit data starting from a second symbol. In some aspects, the method may further include configuring another secondary UE (302b) with uplink CG for uplink transmission on the CG resource, and the other secondary UE may be configured to only transmit data starting from a third symbol.

In some aspects, the method may further include configuring the secondary UE to only transmit data starting from a kth symbol, and k may be an integer greater than 2. In some aspects, the method may further include configuring another secondary UE (302b) with uplink CG for uplink transmission on the CG resource, and the other secondary UE may be configured to only transmit data starting from a 2*kth symbol.

Still another aspect of the invention may provide a network node adapted to configure a primary user equipment (UE) with uplink configured grant (CG) for uplink transmission on a CG resource. The network node may be further adapted to configure a secondary UE with uplink CG for uplink transmission on the CG resource.

Yet another aspect of the invention may provide a computer program comprising instructions for adapting an apparatus to perform the method of any of the aspects described above.

Still another aspect of the invention may provide a carrier containing the computer program of the aspect described above, and the carrier may be one of an electronic signal, optical signal, radio signal, or compute readable storage medium.

Yet another aspect of the invention may provide an apparatus including processing circuitry and a memory, the memory may contain instructions executable by the processing circuitry, and the apparatus may be operative to perform the method of any of the aspects described above.

Still another aspect of the invention may provide a secondary user equipment (UE) including a determining module for determining that a primary UE will not transmit or is not transmitting data on a configured grant (CG) resource that is shared by the primary UE and the secondary UE. The secondary UE may further include a transmitting module for transmitting data on the CG resource if the primary UE will not transmit or is not transmitting data on the CG.

Yet another aspect of the invention may provide a network node including a first configuring module for configuring a primary user equipment (UE) with uplink configured grant (CG) for uplink transmission on a CG resource. The network node may further include a second configuring module for configuring a secondary UE with uplink CG for uplink transmission on the CG resource.

Still another aspect of the invention may provide a secondary user equipment (UE) (302b) adapted to perform the method of any one of the aspects described above.

Still another aspect of the invention may provide a network node (304) adapted to perform the method of any one of the aspects described above.

BRIEF DESCRIPTION OF THE DRAWINGS

The accompanying drawings, which are incorporated herein and form part of the specification, illustrate various embodiments.

DETAILED DESCRIPTION

In this application, the term "node" can be a network node or a user equipment (UE). Examples of network nodes include, but are not limited to, a NodeB, a base station (BS), a multi-standard radio (MSR) radio node such as a MSR BS, an eNodeB, a gNodeB, a Master eNB (MeNB), a Secondary eNB (SeNB), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, remote radio unit (RRU), remote radio head (RRH), nodes in distributed antenna system (DAS), core network node (e.g. MSC, MME, etc.), O&M, OSS, SON, positioning node (e.g. E-SMLC).

In this application, the term "user equipment" or "UE" is a non-limiting term that refers to any type of wireless device communicating with a network node and/or with another UE in a cellular or mobile communication system. Examples of UEs include, but are not limited to, a target device, a device to device (D2D) UE, a vehicular to vehicular (V2V), a machine type UE, an machine type communication (MTC) UE, a UE capable of machine to machine (M2M) communication, a PDA, a Tablet, a mobile terminal(s), a smart phone, laptop embedded equipment (LEE), laptop mounted equipment (LME), and USB dongles.

In this application, the terms "radio network node," "network node," and "NW node" is generic terminology that refers to any kind of network node including but not limited to a base station, a radio base station, a base transceiver station, a base station controller, a network controller, an evolved Node B (eNB), a Node B, a gNodeB (gNB), a relay node, an access point (AP), a radio access point, a Remote Radio Unit (RRU), a Remote Radio Head (RRH), a Central Unit (e.g. in a gNB), a Distributed Unit (e.g. in a gNB), a Baseband Unit, a Centralized Baseband, and a C-RAN.

In this application, the term "radio access technology" or "RAT" may refer to any RAT including, for example and without limitation, UTRA, E-UTRA, narrow band internet of things (NB-IoT), WiFi, Bluetooth, next generation RAT, New Radio (NR), 4G, and 5G. Any of the equipment denoted by the terms "node," "network node," or "radio network node" may be capable of supporting a single or multiple RATs.

Figure 1:
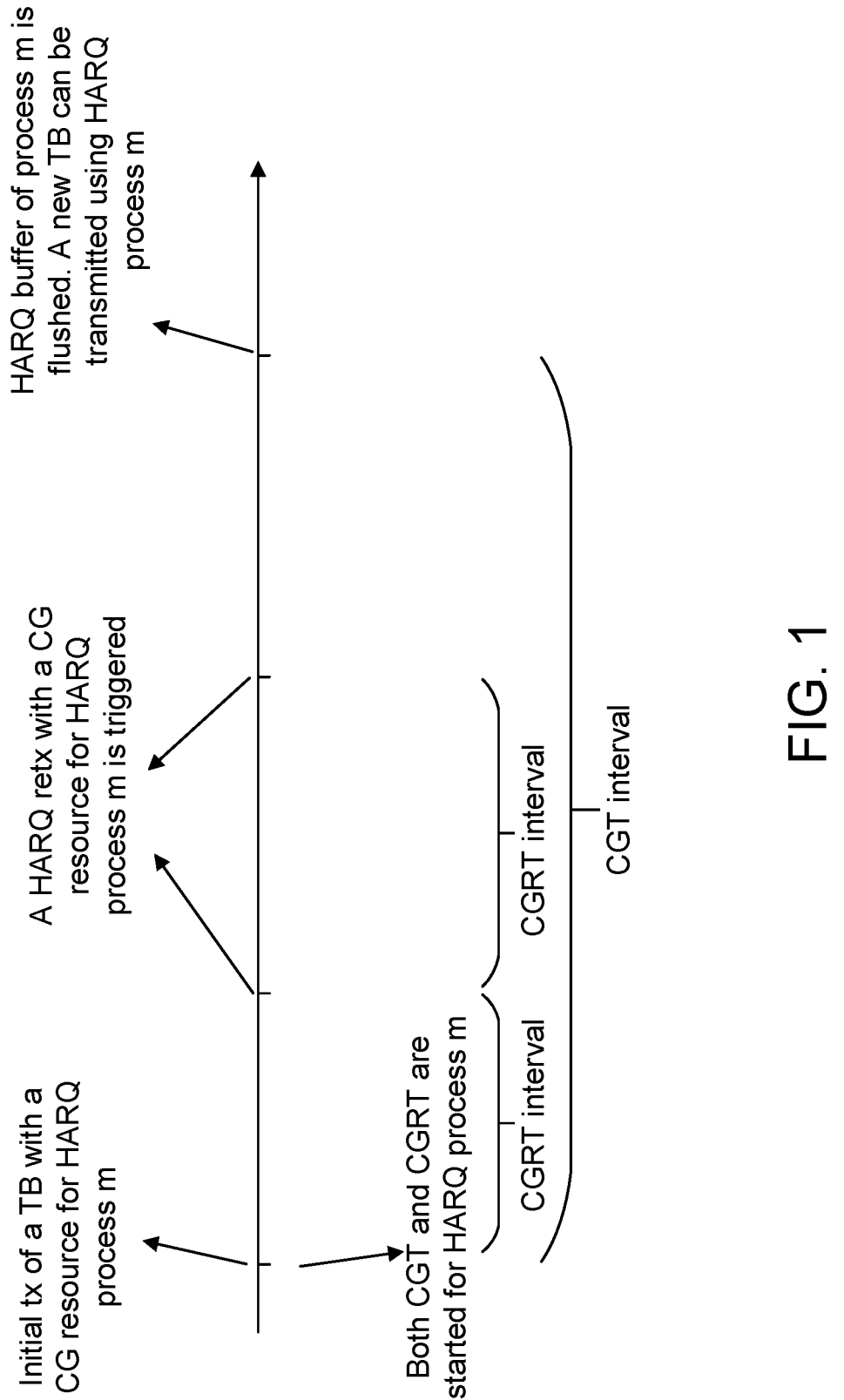
FIG. 1 illustrates a procedure for controlling a maximum number of autonomous uplink (AUL) retransmissions using a configuredGrantTimer (CGT).
Figure 2:
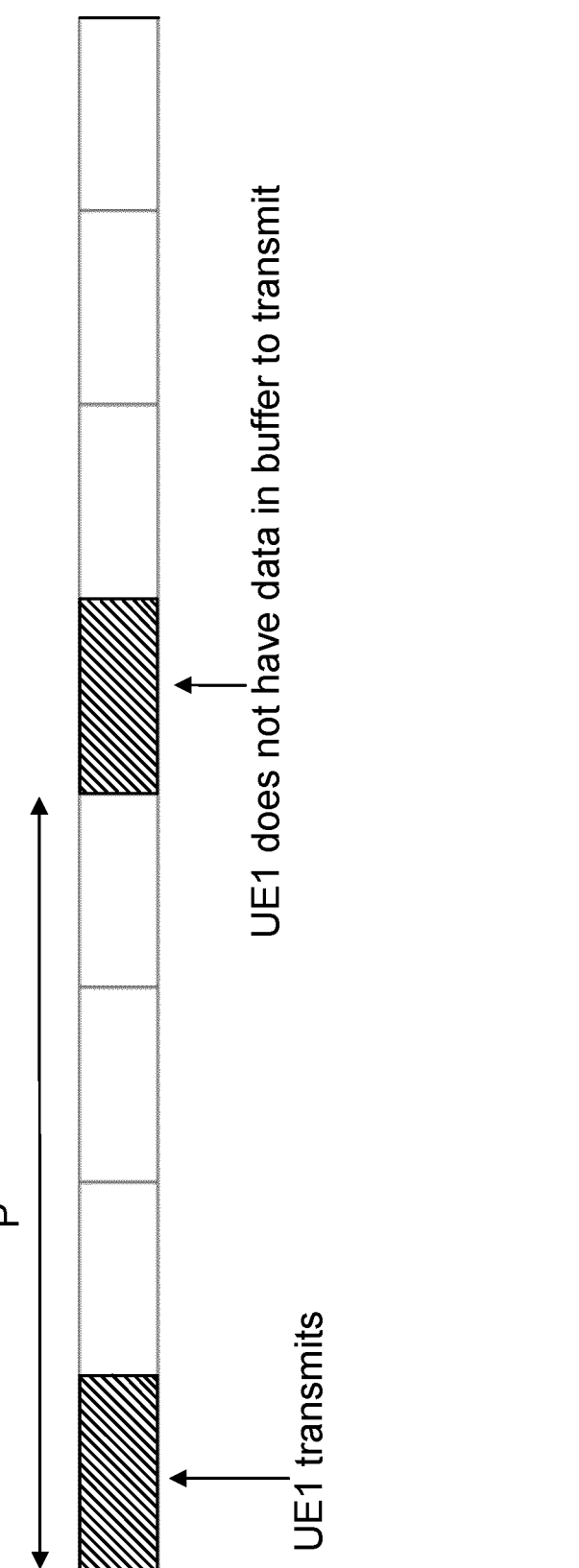
FIG. 2 illustrates a user equipment (UE) configured for uplink (UL) channel (CH) with periodicity P=4 slots.
Figure 3:
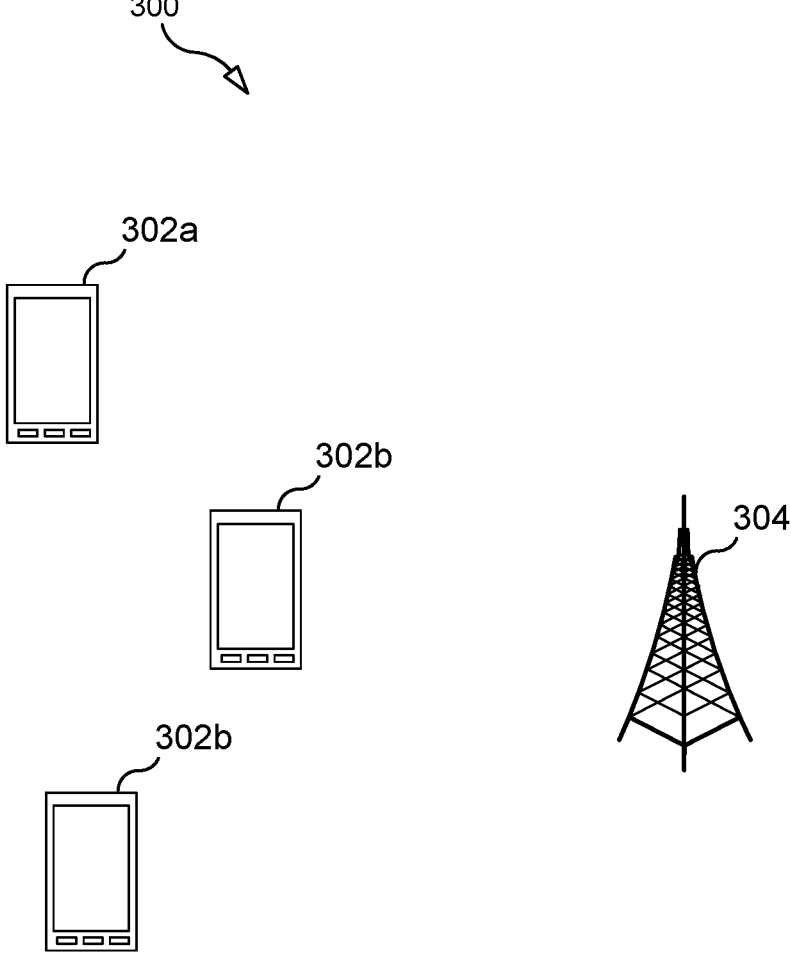
FIG. 3 illustrates a system including a primary UE, one or more secondary UEs, and one or more network nodes according to some aspects.

In some aspects, as shown in FIG. 3, a system 300 may include one or more UEs 302 and/or one or more network nodes 304. In some aspects, the one or more UEs 302 may include a primary UE 302a and/or one or more secondary UEs 302b. In some aspects, one or more configured grant (CG) resources may be shared among a primary UE 302a and one or more secondary UEs 302b. In some aspects, when a primary UE 302a has data in its buffer, the primary UE 302a may transmit the data on the CG resources. In some aspects, if the primary UE 302a does not transmit data on the CG resources (e.g., because the primary UE 302a does not have data in its buffer), then a secondary UE 302b may transmit data on the given one or more CG resources.

Different aspects of methods, apparatuses (e.g., UEs and/or network nodes), and systems for enabling transmission mechanisms between primary and secondary UEs 302a and 302b are described below.

3.1. Listen Before Transmission (LBT) and/or Clear Channel Assessment (CCA)

In some aspects, a secondary UE 302b may perform listen before transmission (LBT) or clear channel assessment (CCA) on the configured resources and listen to the activity of the primary UE 302a. In some aspects, LBT and/or CCA may require a minimum sensing bandwidth (e.g., X MHz or X physical resource blocks (PRBs)). In some alternative aspects (e.g., in the case that configured resources are not spanning sufficient frequency region for an LBT and/or CCA operation), a secondary UE 302b may apply one or more collision detection mechanisms other than LBT and/or CCA.

In some aspects, if the channel is free and the primary UE 302a is not transmitting data on the configured resources, a secondary UE 302b may transmit data on the available resources. In some aspects, a network node 304 (e.g., a gNB) may determine which of the UEs 302 transmitted the data based on one or more of the conditions. In some aspects, the one or more conditions may use (i) the UE's demodulation reference signal (DMRS) sequence, (ii) configured grant uplink control information (CG-UCI) (e.g., CG-UCI may include a new field indicating a UE's information or identity), and/or (iii) a transmission timing offset. In some aspects, the network node 304 may be able to use the transmission timing offset because a secondary UE 302b may start transmitting after listening to the channel, and there will be an offset (e.g., a short offset) in transmission relative to a primary UE 302b, which may start transmitting immediately. That is, a secondary UE 302b may start transmitting later than a primary UE 302a would have (if the primary UE 302a were transmitting). In some aspects, because of the delay before secondary UEs 302b may start transmitting, secondary UEs 302b may not be able to transmit data occupying the full slot. In some aspects where there are multiple secondary UEs 302b configured, one or more secondary UEs 302b (e.g., each secondary UE 302b) may be configured with a different transmission timing offset. In some aspects, a network node 304 may be able to tell whether a transmission is from the primary UE 302a or a secondary UE 302b (and/or from which of two or more secondary UEs 302b) based on the timing of the start of the transmission.

In some aspects, a first orthogonal frequency multiplexing (OFDM) symbol (or part of the first OFDM symbol) may be reserved for the secondary UEs 302b to perform LBT and/or CCA (or collision detection). In some aspects, if a UE 302b senses that the resource is free, the secondary UE 302b may start to occupy the resource and transmit using the remaining duration. In some aspects, if a secondary UE 302b starts transmission and the remaining resource is not enough for its transport block, the secondary UE 302b may perform rate matching around the symbols lost for the LBT and/or CCA (or collision detection) process.

In some aspects, although the primary UE 302a and the one or more secondary UEs 302b may share the same configured resource, the primary UE 302a and the one or more secondary UEs 302b may apply different mapping types. For example, in some aspects, the primary UE 302a may be allocated with a longer physical uplink shared channel (PUSCH) duration, while the one or more secondary UEs 302b may be allocated with a shorter PUSCH duration. In this example, due to a LBT and/or CCA (or other collision detection) operation, a secondary UE 302b may miss the first PUSCH occasion but may transmit using the remaining PUSCH occasions.

In some aspects, a maximum channel/resource occupancy time may be configured for a secondary UE 302b so that this secondary UE 302b will not block the resource in case the primary UE 302a has new data. However, the primary UE 302a may start transmission late in some scenarios, and, in such scenarios, there can be collision if the primary UE 302a is not transmitting during the secondary UE 302b's listening time and suddenly both UEs 302 start transmitting. To deter such behavior, the beginning of the transmission symbols may be fixed and made different to ensure that both UE's transmission cannot start at the same time. In some aspects, if the transmission of a primary UE 302a has been delayed, the primary UE 302a may be required to sense the channel as it may happen that a secondary UE 302b already occupied the channel after the secondary UE 302b sensed the channel to be free. In some aspects, the primary UE 302a may additionally or alternatively may be required to start its transmission in the first symbol. If the primary UE 302a is not able to start its transmission in the first symbol, the primary UE 302a may be required to wait until the next transmission occasion. In this way, it can be guaranteed that the primary and secondary UEs 302 will not collide. In some aspects, if a collision between the primary UE and a secondary UE is detected, the secondary UE 302b may perform back-off to release resources.

In some aspects, several UEs 302 share the configured grant (CG), and the UEs 302 may be configured with different priorities. In some aspects, if the UE 302 with the highest priority has data to transmit, the UE 302 with the highest priority may only transmit data starting from the first symbol. In some aspects, if the UE 302 with the second highest priority has data to transmit, the UE 302 with the second highest priority may sense the first symbol and, if no activity is detected, start transmitting from the second symbol. In some aspects, if the UE 302 with the third highest priority has data to transmit, the UE 302 with the third highest priority may sense the first and second symbols and, if no activity is detected, start transmitting from the third symbol. In some aspects, the UE 302 with nth highest priority may sense the first n−1 symbols and, if no activity is detected, start transmitting from the nth symbol.

In some aspects, a gap may be introduced between the sensing and transmission. For example, in some aspects, if the UE 302 with the highest priority has data to transmit, the UE 302 with the highest priority may only transmit data starting from the first symbol. In some aspects, if the UE 302 with the second highest priority has data to transmit, the UE 302 with the second highest priority may sense the first symbol and, if no activity is detected, start transmitting from the kth symbol. In some aspects, if the UE 302 with the third highest priority has data to transmit, the UE 302 with the third highest priority may sense the first k symbols and, if no activity is detected, start transmitting from the 2*kth symbol (e.g., from the 8th symbol if k=4). In some aspects, the UE 302 with nth highest priority may sense the first (n−1)*k symbols and, if no activity is detected, start transmitting from the n*kth symbol (e.g., from the 12th symbol if n=3 and k=4). In some aspects, k may be an integer greater than 1 (e.g., 2, 3, 4, 5, etc.).

3.2. Handshaking and/or Negotiations Between Primary and Secondary UEs

In some aspects, a secondary UE 302b may communicate with the primary UE 302a (e.g., via device-to-device communication and/or or side-link) and perform handshaking and/or negotiations. In some aspects, the handshaking and/or negotiations may include the secondary UE 302b asking for permission from the primary UE 302a. In some aspects, the secondary UE 302b may ask the primary UE 302a if the primary UE 302a wants to use the resources in next transmission occasion (TO). In some aspects, if the primary UE 302a does not want to use the resources in the next TO, then the primary UE 302a may give permission to the secondary UE 302b (e.g., via side-link and/or device-to-device communication mode).

In some alternative aspects, the handshaking and/or negotiations may include the primary UE 302a broadcasting its buffer status reports (BSRs) to its neighboring UEs 302 (which may include one or more secondary UEs 302b). In these aspects, the one or more secondary UE 302b that neighbor the primary UE 302a may receive the broadcasted buffer status reports of the primary UE 302a and know whether the primary UE 302a will transmit in the next TO or not. In some alternative aspects, the primary UE 302a may multicast its BSRs to the concerned secondary UEs 302b only.

In some other alternative aspects, the handshaking and/or negotiations may include the primary UE 302a may signal the one or more secondary UEs 302b to indicate whether the resources will be occupied for a certain time by the primary UE 302a. In these aspects, a secondary UE 302b may only use the resources if the primary UE is not planning to use the resources.

In some aspects, a physical uplink control channel (PUCCH) resource configured for scheduling request (SR) transmission (SR-PUCCH resource) is configured sequentially in time per UE 302 close in time prior to the transmission occasions (TOs). In some aspects, any UE 302 that intends to use the TO may need to first transmit on their respective SR resource and monitor the SR resources of the other UEs 302. In this way, in some aspects, any UE 302 that wants to transmit on the TO will know if any other UE 302 also wants to transmit in the same TO. In some aspects, by configuring a priority order (e.g. primary, secondary, third, etc.), the UE 302 that transmits a SR and has the highest priority may be allowed to use the TO. In some aspects, the UEs 302 with lower priority may receive the SR of the UE 302 with higher priority and refrain from transmitting. In some aspects, this method may enable multiple UEs 302 to share the same CG.

3.3 Flowcharts

Figure 4:
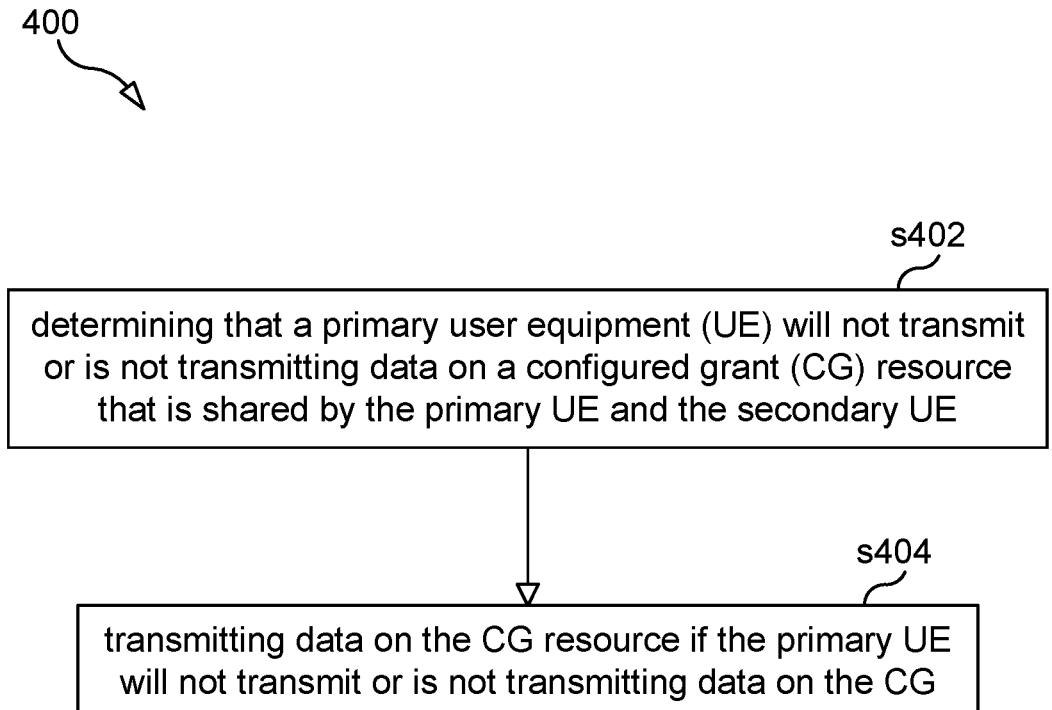
FIG. 4 is a flow chart illustrating a process performed by a secondary UE according to some aspects.

FIG. 4 illustrates a process 400 performed by a second user equipment (UE) 302b according to some aspects. In some aspects, the process 400 may include a step 402 in which the secondary UE 302b determines that a primary UE 302a will not transmit or is not transmitting data on a configured grant (CG) resource that is shared by the primary UE 302a and the secondary UE 302b. In some aspects, the process 400 may include a step 404 in which the secondary UE 302b transmits data on the CG resource if the primary UE 302a will not transmit or is not transmitting data on the CG.

In some aspects, the step 402 may include the secondary UE 302b determining that the primary UE 302a is not transmitting data on the CG resource. In some aspects in which the secondary UE 302b determines that the primary UE 302a is not transmitting data on the CG resource, the step 402 may include sensing no activity on the CG resource. In some aspects, determining that the primary UE 302a is not transmitting data on the CG resource may include the secondary UE 302b performing a collision detection mechanism such as, for example and without limitation, listen before transmission (LBT) or clear channel assessment (CCA).

In some aspects, the step 404 may include the secondary UE 302b transmitting data on only a portion of the CG resource. In some aspects, the portion of the CG resource may be a remaining portion of the CG resource that was not used while the secondary UE 302b was determining that the primary UE is not transmitting data on the CG resource. In some aspects, the timing of the start of transmitting the data on the CG resource in step 404 may be offset from the timing of the start of the CG resource.

In some aspects, the step 402 may include the secondary UE 302b using an orthogonal frequency multiplexing (OFDM) symbol or a portion of an OFDM symbol reserved for determining that the primary UE 302a is not transmitting data on the CG resource.

In some aspects, the step 404 may include the secondary UE 302b transmitting data on the CG resource may include performing rate matching around symbols used for determining that the primary UE 302a is not transmitting data on the CG resource (e.g., if the secondary UE 302b determines that the remaining resource is not enough for its transport block).

In some aspects, the secondary UE 302b may apply a different mapping type than the primary UE 302a. For example, in some aspects, the secondary UE 302b may be allocated with a physical uplink shared channel (PUSCH) that has a shorter duration than the PUSCH with which the primary UE 302a is allocated.

In some aspects, the secondary UE 302b may be configured with a maximum resource occupancy time (e.g., so that this secondary UE 302b will not block the resource in case the primary UE 302a has new data).

In some aspects, the process 400 may further include a step in which the secondary UE 302b stops transmitting the data on the CG resource to release the CG resource if a collision between the primary UE 302a and the secondary UE 302b occurs.

In some aspects, the step 402 may include the secondary UE 302b sensing no activity on a first symbol, and the step 404 may include the secondary UE 302b starting transmitting data from a second symbol if no activity is sensed on the first symbol. In some alternative aspects, the step 402 may include the secondary UE 302b sensing no activity on a first symbol (e.g., because the primary UE 302a is not transmitting data on the CG resource), the process 400 may further include a step in which the secondary UE 302b senses no activity on a second symbol (e.g., because another secondary UE 302b is not transmitting data on the CG resource), and the step 404 may include the secondary UE 302b starting transmitting data from a third symbol if no activity is sensed on the first and second symbols.

In some aspects, the primary UE 302a may have a highest priority, the secondary UE 302b may have an nth highest priority, the process 400 may include a step in which the secondary UE 302b senses no activity on a first n−1 symbols (e.g., because UEs 302 having the highest through n-1th highest priorities are not transmitting data on the shared CG resource), and the step 404 may include the secondary UE 302b starting transmitting data from an nth symbol if no activity is sensed on the first n−1 symbols. In some aspects, the step of sensing no activity on a first n−1 symbols may include the step 402 (e.g., in which the secondary UE 302b determines that the primary UE 302a is not transmitting data on the CG resource that is shared by at least the primary UE 302a and the secondary UE 302b by sensing no activity on the first symbol).

In some aspects, the process 400 may include a step of sensing no activity on the CG resource and a step of introducing a gap between the step of sensing no activity on the CG resource and the step 404 of transmitting data on the CG resource. In some aspects, the step of sensing no activity on the CG resource may include, for example and without limitation, the step 402. In some aspects, the step 402 may include the secondary UE 302b sensing no activity on a first symbol (e.g., because the primary UE 302a is not transmitting data on the CG resource), the step 404 may include the secondary UE 302b starting transmitting data from a kth symbol if no activity is sensed on the first symbol, and k may be an integer greater than 2. In some alternative aspects, the process 400 may include a step in which the secondary UE 302b senses no activity on a first k symbols (e.g., because the primary UE 302a and another secondary UE 302b are not transmitting data on the shared CG resource), the step 404 may include the secondary UE 302b starting transmitting data from a 2*kth symbol if no activity is sensed on the first k symbols, and k may be an integer greater than 1. In some aspects, the step of sensing no activity on a first k symbols may include the step 402 (e.g., in which the secondary UE 302b determines that the primary UE 302a is not transmitting data on the CG resource that is shared by at least the primary UE 302*a* and the secondary UE 302*b* by sensing no activity on the first symbol).

In some aspects, the primary UE 302*a* may have a highest priority, the secondary UE 302*b* may have an nth highest priority, the process 400 may include a step in which the secondary UE 302*b* senses no activity on a first (n–1)*k symbols (e.g., because UEs 302 having the highest through n-lth highest priorities are not transmitting data on the shared CG resource), the step 404 may include the secondary UE 302*b* starting transmitting data from an n*kth symbol if no activity is sensed on the first (n–1)*k symbols, and k may be an integer greater than 1. In some aspects, the step of sensing no activity on a first (n–1)*k symbols may include the step 402 (e.g., in which the secondary UE 302*b* determines that the primary UE 302*a* is not transmitting data on the CG resource that is shared by at least the primary UE 302*a* and the secondary UE 302*b* by sensing no activity on the first symbol).

In some aspects, the step 402 may include the secondary UE 302*b* determining that the primary UE 302*a* will not transmit data on the CG resource (e.g., in the next TO). In some aspects, determining in step 402 that the primary UE 302*a* will not transmit data on the CG resource may include communicating with the primary UE 302*a*. In some aspects, determining in step 402 that the primary UE 302*a* will not transmit data on the CG resource may include performing handshaking and/or negotiations with the primary UE 302*a*. In some aspects, determining in step 402 that the primary UE 302*a* will not transmit data on the CG resource may include asking the primary UE 302*a* for permission to transmit data on the CG resource in the next transmission occasion (TO). In some aspects, determining in step 402 that the primary UE 302*a* will not transmit data on the CG resource may further include receiving from the primary UE 302*a* permission to transmit data on the CG resource in the next TO.

In some aspects, determining in step 402 that the primary UE 302*a* will not transmit data on the CG resource may include receiving from the primary UE an indication that the primary UE 302*a* will not transmit data on the CG resource in the next transmission occasion (TO). In some aspects, the indication that the primary UE 302*a* will not transmit data on the CG resource in the next TO may be a buffer status report. In some aspects, the indication that the primary UE 302*a* will not transmit data on the CG resource in the next TO may be received as part of a broadcast or a multicast from the primary UE 302*a*. In some aspects, the indication that the primary UE 302*a* will not transmit data on the CG resource in the next TO may indicate that the CG resource will not be occupied by the primary UE 302*a* for a certain time.

In some aspects, determining in step 402 that the primary UE 302*a* will not transmit data on the CG resource may include monitoring a physical uplink control channel (PUCCH) resource configured for scheduling request (SR) transmission (SR-PUCCH resource) and determining that the primary UE 302*a* has not transmitted an SR. In some aspects, the process 400 may further include a step in which the secondary UE 302*b* determines that no other secondary UE 302*b* having a priority higher than the priority of the secondary UE 302*b* has transmitted an SR. In some aspects, the process 400 may further include a step in which the secondary UE 302*b* transmits an SR prior to transmitting data on the CG resource.

Figure 5:
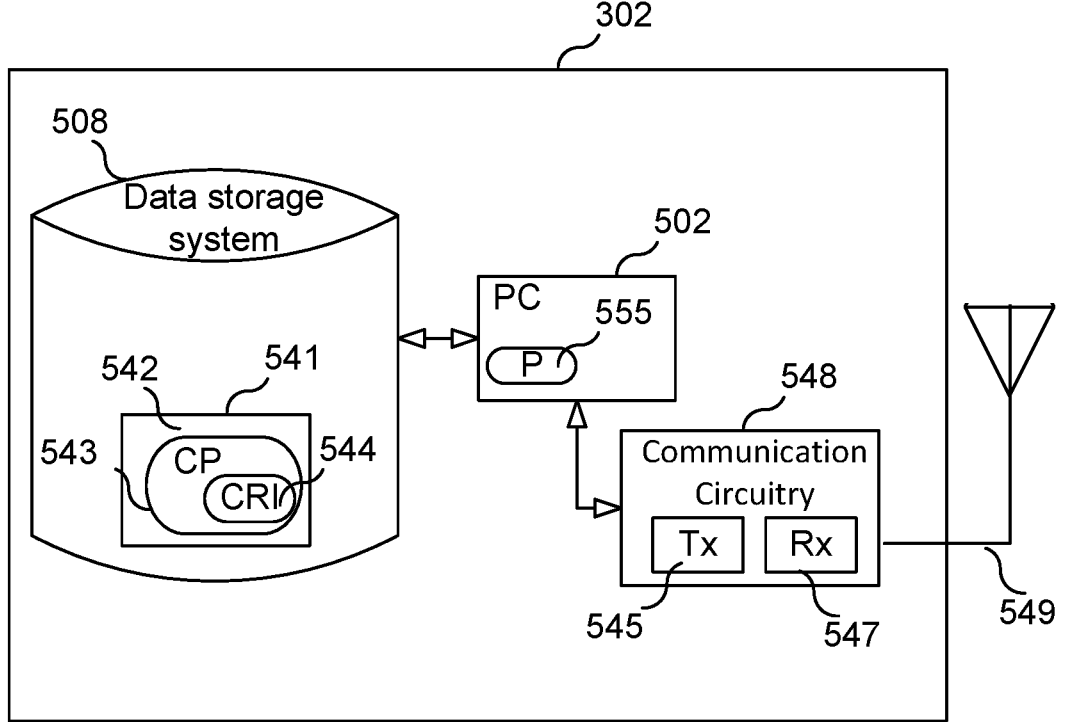
FIG. 5 is a block diagram of a UE according to some aspects.

FIG. 5 is a block diagram of UE 302 (e.g., a primary UE 302*a* or a secondary UE 302*b*), according to some aspects. As shown in FIG. 5, UE 302 may include: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like); communication circuitry 548, which is coupled to an antenna arrangement 549 comprising one or more antennas and which comprises a transmitter (Tx) 545 and a receiver (Rx) 547 for enabling UE 302 to transmit data and receive data (e.g., wirelessly transmit/receive data); and a local storage unit (a.k.a., "data storage system") 508, which may include one or more non-volatile storage devices and/or one or more volatile storage devices. In some aspects where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some aspects, the CRI 544 of computer program 543 is configured such that when executed by PC 502, the CRI causes UE 302 to perform steps described herein (e.g., steps described herein with reference to the process 400). In other aspects, UE 302 may be configured to perform steps described herein without the need for code. That is, for example, PC 502 may consist merely of one or more ASICs. Hence, the features of the aspects described herein may be implemented in hardware and/or software.

Figure 6:
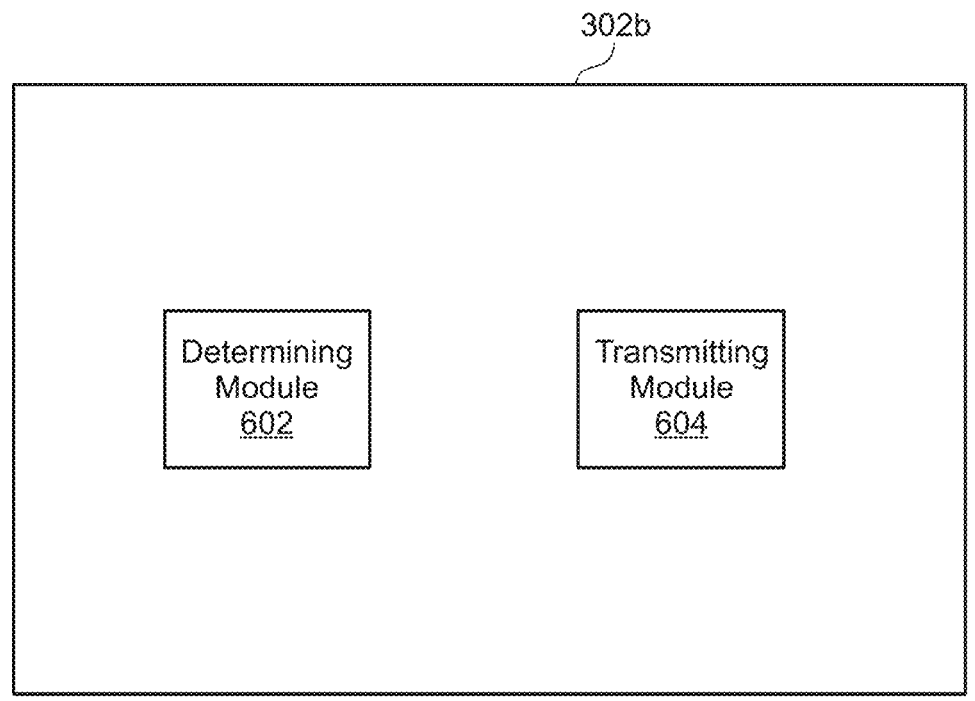
FIG. 6 is a block diagram of a secondary UE according to some aspects.

FIG. 6 is a block diagram of a secondary user equipment (UE) 302*b* according to some aspects. As shown in FIG. 6, in some aspects, the secondary UE 302*b* may include a determining module 602 for determining that a primary UE 302*a* will not transmit or is not transmitting data on a configured grant (CG) resource that is shared by the primary UE 302*a* and the secondary UE 302*b*. In some aspects, the secondary UE 302*b* may further include a transmitting module 604 for transmitting data on the CG resource if the primary UE 302*a* will not transmit or is not transmitting data on the CG.

Figure 7:
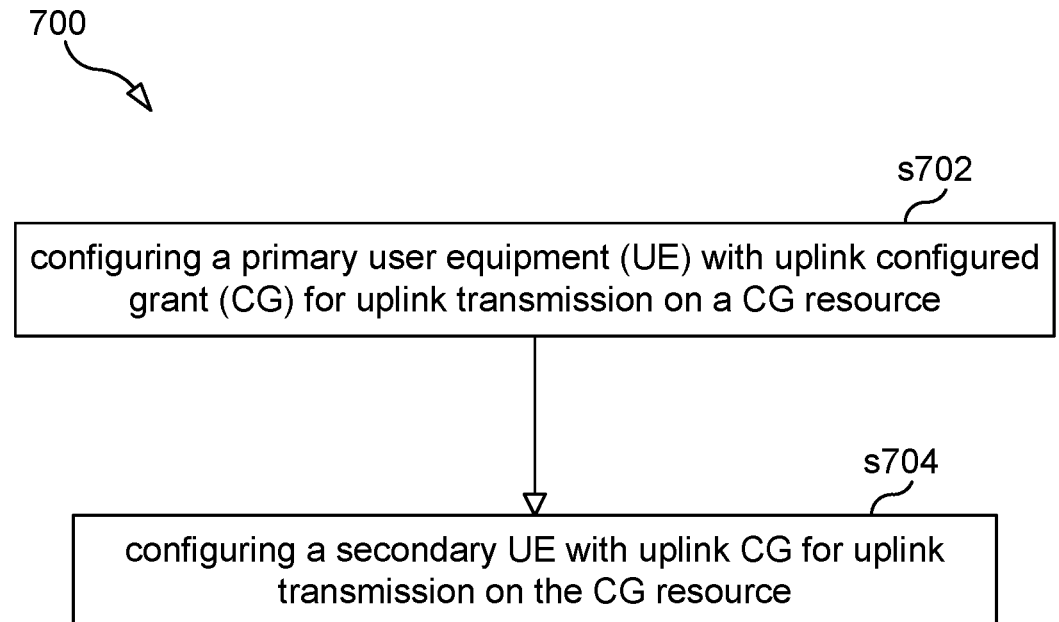
FIG. 7 is a flow chart illustrating a process performed by a network node according to some aspects.

FIG. 7 illustrates a process 700 performed by a network node 304 according to some aspects. In some aspects, the process 700 may include a step 702 in which the network node 304 configures a primary user equipment (UE) 302*a* with uplink configured grant (CG) for uplink transmission on a CG resource. In some aspects, the process 700 may include a step 702 in which the network node 304 configures a secondary UE 302*b* with uplink CG for uplink transmission on the CG resource.

In some aspects, the process 700 may further include a step in which the network node 304 receives data transmitted on the CG resource. In some aspects, the process 700 may further include a step in which the network node 304 determines which of the primary UE 302*a* and secondary UE 302*b* transmitted the data. In some aspects, determining which of the primary UE 302*a* and secondary UE 302*b* transmitted the data may include using a demodulation reference signal (DMRS) sequence. In some aspects, determining which of the primary UE 302*a* and secondary UE 302*b* transmitted the data may additionally or alternatively include using configured grant uplink control information (CG-UCI). In some aspects, the CG-UCI may include a field indicating information or an identity of the UE 302 that transmitted the data. In some aspects, determining which of the primary UE 302a and secondary UE 302b transmitted the data may additionally or alternatively include using a transmission timing offset.

In some aspects, the process 700 may further include a step in which the network node 304 configures multiple secondary UEs 302b with uplink CG for uplink transmission on the CG resource. In some aspects, each of the secondary UEs 302b may be configured with a different transmission timing offset. In some aspects, the process 700 may further include a step in which the network node 304 receives data transmitted on the CG resource. In some aspects, the process 700 may further include a step in which the network node 304 determines a transmission timing offset of the received data. In some aspects, the process 700 may further include a step in which the network node 304 determines which of the multiple secondary UEs 302b transmitted the data using the transmission timing offset of the received data.

In some aspects, the process 700 (e.g., the step 704 of the process 700) may further include allocating the secondary UE 302b with a physical uplink shared channel (PUSCH) having a shorter duration than the PUSCH with which the primary UE 302a is allocated.

In some aspects, the process 700 (e.g., the step 702 of the process 700) may further include configuring the primary UE 302a to only transmit data starting from a first symbol. In some aspects, the process 700 (e.g., the step 704 of the process 700) may further include configuring the secondary UE 302b to only transmit data starting from a second symbol. In some aspects, the process 700 may further include a step in which the network node 304 configures another secondary UE 302b with uplink CG for uplink transmission on the CG resource, and the other secondary UE 302b may be configured to only transmit data starting from a third symbol. In some alternative aspects, the process 700 (e.g., the step 704 of the process 700) may further include configuring the secondary UE 302b to only transmit data starting from a kth symbol, and k may be an integer greater than 2. In some of the alternative aspects, the process 700 may further include a step in which the network node 304 configures another secondary UE 302b with uplink CG for uplink transmission on the CG resource, and the other secondary UE 302b may be configured to only transmit data starting from a 2*kth symbol.

Figure 8:
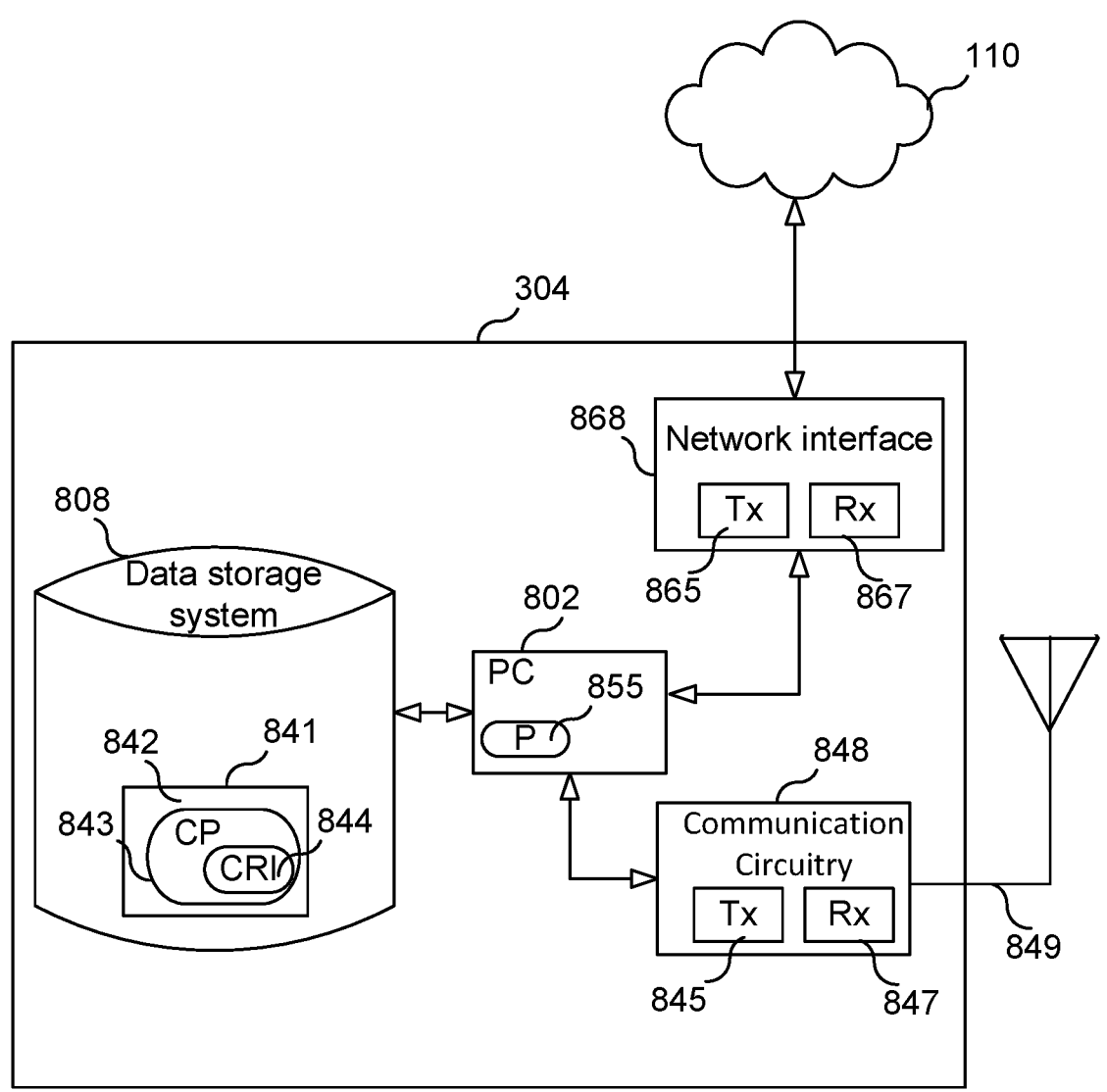
FIG. 8 is a block diagram of a network node according to some aspects.

FIG. 8 is a block diagram of a network node 304, according to some aspects. As shown in FIG. 8, the network node 304 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the network node 304 may be a distributed computing apparatus); a network interface 868 comprising a transmitter (Tx) 865 and a receiver (Rx) 867 for enabling the network node 304 to transmit data to and receive data from other nodes connected to a network 110 (e.g., an Internet Protocol (IP) network) to which network interface 868 is connected; communication circuitry 848, which is coupled to an antenna arrangement 849 comprising one or more antennas and which comprises a transmitter (Tx) 845 and a receiver (Rx) 847 for enabling the network node 304 to transmit data and receive data (e.g., wirelessly transmit/receive data); and a local storage unit (a.k.a., "data storage system") 808, which may include one or more non-volatile storage devices and/or one or more volatile storage devices. In aspects where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some aspects, the CRI 844 of computer program 843 is configured such that when executed by PC 802, the CRI causes the network node 304 to perform steps described herein (e.g., steps described herein with reference to the process 700). In other aspects, the network node 304 may be configured to perform steps described herein without the need for code. That is, for example, PC 802 may consist merely of one or more ASICs. Hence, the features of the aspects described herein may be implemented in hardware and/or software.

Figure 9:
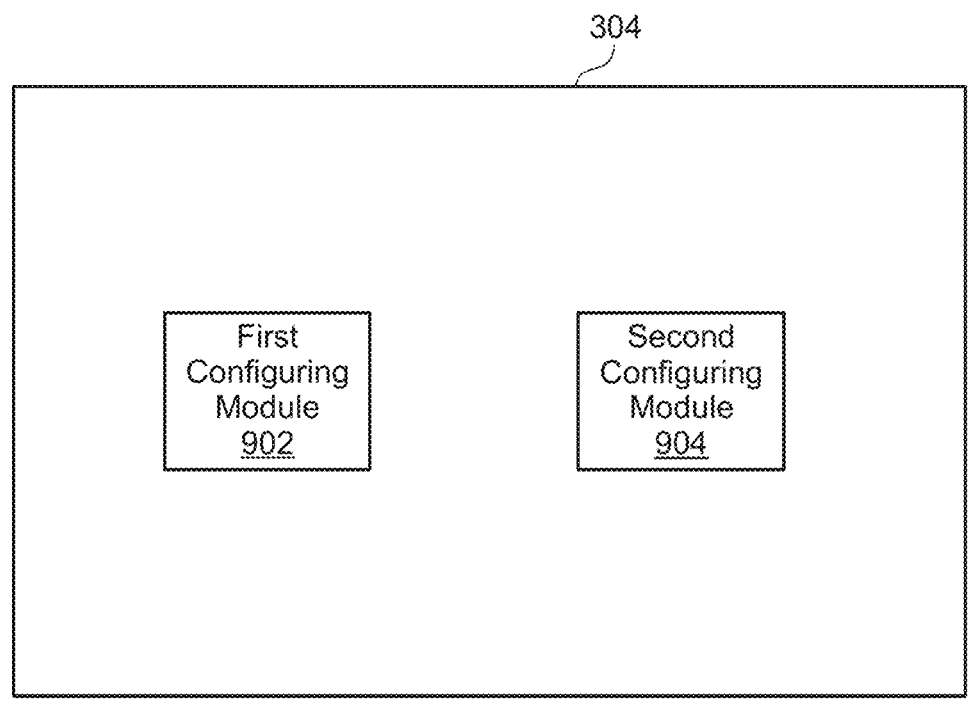
FIG. 9 is a block diagram of a network node according to some aspects.

FIG. 9 is a block diagram of a network node 304 according to some aspects. As shown in FIG. 9, in some aspects, the network node 304 may include a first configuring module 902 for configuring a primary user equipment (UE) 302a with uplink configured grant (CG) for uplink transmission on a CG resource. In some aspects, the network node 304 may further include a second configuring module 904 for configuring a secondary UE 302b with uplink CG for uplink transmission on the CG resource.

Summarized Embodiments

A1. A method (400) performed by a secondary user equipment (UE) (302b), the method comprising: determining that a primary UE (302a) will not transmit or is not transmitting data on a configured grant (CG) resource that is shared by the primary UE and the secondary UE; and transmitting data on the CG resource if the primary UE will not transmit or is not transmitting data on the CG.

A2. The method of embodiment A1, wherein determining that the primary UE will not transmit or is not transmitting data on the CG resource comprises determining that the primary UE is not transmitting data on the CG resource.

A3. The method of embodiment A2, wherein determining that the primary UE is not transmitting data on the CG resource comprises sensing no activity on the CG resource.

A4. The method of embodiment A2 or A3, wherein determining that the primary UE is not transmitting data on the CG resource comprises performing listen before transmission or clear channel assessment.

A5. The method of any one of embodiments A2-A4, wherein transmitting data on the CG resource comprises transmitting data on only a portion of the CG resource.

A6 The method of embodiment A5, wherein the portion of the CG resource is a remaining portion of the CG resource that was not used in determining that the primary UE is not transmitting data on the CG resource.

A7. The method of any one of embodiments A2-A6, wherein the timing of the start of transmitting the data on the CG resource is offset from the timing of the start of the CG resource.

A8. The method of any one of embodiments A2-A7, wherein determining that the primary UE is not transmitting data on the CG resource comprises using an orthogonal frequency multiplexing (OFDM) symbol or a portion of an OFDM symbol reserved for determining that the primary UE is not transmitting data on the CG resource.

A9. The method of any one of embodiments A2-A8, wherein transmitting data on the CG resource comprises performing rate matching around symbols used for determining that the primary UE is not transmitting data on the CG resource.

A10. The method of any one of embodiments A2-A9, wherein the secondary UE applies a different mapping type than the primary UE.

A11. The method of embodiment A10, wherein the secondary UE is allocated with a physical uplink shared channel (PUSCH) that has a shorter duration than the PUSCH with which the primary UE is allocated.

A12. The method of any one of embodiments A2-A11, wherein the secondary UE is configured with a maximum resource occupancy time.

A13. The method of any one of embodiments A2-A12, further comprising stopping transmitting the data on the CG resource to release the CG resource if a collision between the primary UE and the secondary UE occurs.

A14. The method of any one of embodiments A2-A13, wherein determining that the primary UE is not transmitting data on the CG resource comprises sensing no activity on a first symbol, and transmitting data on the CG resource comprises starting transmitting data from a second symbol if no activity is sensed on the first symbol.

A15. The method of any one of embodiments A2-A13, wherein: determining that the primary UE is not transmitting data on the CG resource comprises sensing no activity on a first symbol; the method further comprises sensing no activity on a second symbol; and transmitting data on the CG resource comprises starting transmitting data from a third symbol if no activity is sensed on the first and second symbols.

A16. The method of any one of embodiments A2-A13, wherein: the primary UE has a highest priority; the secondary UE has an nth highest priority; the method comprises sensing no activity on a first n−1 symbols; and transmitting data on the CG resource comprises starting transmitting data from an nth symbol if no activity is sensed on the first n−1 symbols.

A17. The method of any one of embodiments A2-A13, comprising: sensing no activity on the CG resource; and introducing a gap between sensing no activity on the CG resource and transmitting data on the CG resource.

A18. The method of any one of embodiments A2-A13 and A17, wherein: determining that the primary UE is not transmitting data on the CG resource comprises sensing no activity on a first symbol; transmitting data on the CG resource comprises starting transmitting data from a kth symbol if no activity is sensed on the first symbol; and k is an integer greater than 2.

A19. The method of any one of embodiments A2-A13 and A17, wherein: the method comprises sensing no activity on a first k symbols; transmitting data on the CG resource comprises starting transmitting data from a 2*kth symbol if no activity is sensed on the first k symbols; and k is an integer greater than 1.

A20. The method of any one of embodiments A2-A13 and A17, wherein: the primary UE has a highest priority; the secondary UE has an nth highest priority; the method comprises sensing no activity on a first (n−1)*k symbols; transmitting data on the CG resource comprises starting transmitting data from an n*kth symbol if no activity is sensed on the first (n−1)*k symbols; and k is an integer greater than 1.

A21. The method of embodiment A1, wherein determining that the primary UE will not transmit or is not transmitting data on the CG resource comprises determining that the primary UE will not transmit data on the CG resource.

A22. The method of embodiment A21, wherein determining that the primary UE will not transmit data on the CG resource comprises communicating with the primary UE.

A23. The method of embodiment A21 or A22, wherein determining that the primary UE will not transmit data on the CG resource comprises performing handshaking and/or negotiations with the primary UE.

A24. The method of any one of embodiments A21-A23, wherein determining that the primary UE will not transmit data on the CG resource comprises asking the primary UE for permission to transmit data on the CG resource in the next transmission occasion (TO).

A25. The method of embodiment A24, wherein determining that the primary UE will not transmit data on the CG resource further comprises receiving from the primary UE permission to transmit data on the CG resource in the next TO.

A26. The method of embodiment A21 or A22, wherein determining that the primary UE will not transmit data on the CG resource comprises receiving from the primary UE an indication that the primary UE will not transmit data on the CG resource in the next transmission occasion (TO).

A27. The method of embodiment A26, wherein the indication that the primary UE will not transmit data on the CG resource in the next TO is a buffer status report.

A28. The method of embodiment A26 or A27, wherein the indication that the primary UE will not transmit data on the CG resource in the next TO is received as part of a broadcast or a multicast from the primary UE.

A29. The method of any one of embodiments A26-A28, wherein the indication that the primary UE will not transmit data on the CG resource in the next TO indicates that the CG resource will not be occupied by the primary UE for a certain time.

A30. The method of any one of embodiments A21 or A22, wherein determining that the primary UE will not transmit data on the CG resource comprises: monitoring a physical uplink control channel (PUCCH) resource configured for scheduling request (SR) transmission (SR-PUCCH resource); and determining that the primary UE has not transmitted an SR.

A31. The method of embodiment A30, further comprising determining that no other secondary UE having a priority higher than the priority of the secondary UE has transmitted an SR.

A32. The method of any one of embodiments A21, A22, A30, and A31, further comprising transmitting an SR prior to transmitting data on the CG resource.

B1. A secondary user equipment (UE) (302b) adapted to: determine that a primary UE (302a) will not transmit or is not transmitting data on a configured grant (CG) resource that is shared by the primary UE and the secondary UE; and transmit data on the CG resource if the primary UE will not transmit or is not transmitting data on the CG.

C1. A method (700) performed by a network node (304), the method comprising: configuring a primary user equipment (UE) (302a) with uplink configured grant (CG) for uplink transmission on a CG resource; and configuring a secondary UE (302b) with uplink CG for uplink transmission on the CG resource.

C2. The method of embodiment C1, further comprising: receiving data transmitted on the CG resource; determining which of the primary UE and secondary UE transmitted the data.

C3. The method of embodiment C2, wherein determining which of the primary UE and secondary UE transmitted the data comprises using a demodulation reference signal (DMRS) sequence.

C4. The method of embodiment C2 or C3, wherein determining which of the primary UE and secondary UE transmitted the data comprises using configured grant uplink control information (CG-UCI).

C5. The method of embodiment C4, wherein the CG-UCI includes a field indicating information or an identity of the UE that transmitted the data.

C6. The method of any one of embodiments C2-05, wherein determining which of the primary UE and secondary UE transmitted the data comprises using a transmission timing offset.

C7. The method of any one of embodiments C1-C6, further comprising: configuring multiple secondary UEs (302b) with uplink CG for uplink transmission on the CG resource, wherein each secondary UE is configured with a different transmission timing offset; receiving data transmitted on the CG resource; and determining which of the multiple secondary UEs transmitted the data using a transmission timing offset of the received data.

C8. The method of any one of embodiments C1-C7, further comprising allocating the secondary UE with a physical uplink shared channel (PUSCH) having a shorter duration than the PUSCH with which the primary UE is allocated.

C9. The method of any one of embodiments C1-C8, further comprising configuring the primary UE to only transmit data starting from a first symbol.

C10. The method of any one of embodiments C1-C9, further comprising configuring the secondary UE to only transmit data starting from a second symbol.

C11. The method of embodiment C10, further comprising configuring another secondary UE (302b) with uplink CG for uplink transmission on the CG resource, wherein the other secondary UE is configured to only transmit data starting from a third symbol.

C12. The method of any one of embodiments C1-C9, further comprising configuring the secondary UE to only transmit data starting from a kth symbol, wherein k is an integer greater than 2.

C13. The method of embodiment C12, further comprising configuring another secondary UE (302b) with uplink CG for uplink transmission on the CG resource, wherein the other secondary UE is configured to only transmit data starting from a 2*kth symbol.

D1. A network node (304) adapted to: configure a primary user equipment (UE) (302a) with uplink configured grant (CG) for uplink transmission on a CG resource; and configure a secondary UE (302b) with uplink CG for uplink transmission on the CG resource.

E1. A computer program comprising instructions for adapting an apparatus to perform the method of any one of embodiments A1-A32 and C1-C13.

F1. A carrier containing the computer program of embodiment E1, wherein the carrier is one of an electronic signal, optical signal, radio signal, or compute readable storage medium.

G1 An apparatus (302a, 302b, or 304), the apparatus comprising: processing circuitry (502 or 802); and a memory (542 or 842), said memory containing instructions (544 or 844) executable by said processing circuitry, whereby said apparatus is operative to perform the method of any one of the embodiments A1-A32 and C1-C13.

H1. A secondary user equipment (UE) (302b) comprising: a determining module (602) for determining that a primary UE (302a) will not transmit or is not transmitting data on a configured grant (CG) resource that is shared by the primary UE and the secondary UE; and a transmitting module (604) for transmitting data on the CG resource if the primary UE will not transmit or is not transmitting data on the CG.

I1. A network node (304) comprising: a first configuring module (902) for configuring a primary user equipment (UE) (302a) with uplink configured grant (CG) for uplink transmission on a CG resource; and a second configuring module (904) for configuring a secondary UE (302b) with uplink CG for uplink transmission on the CG resource.

J1. A secondary user equipment (UE) (302b) adapted to perform the method of any one of embodiments A1-A32.

K1. A network node (304) adapted to perform the method of any one of embodiments C1-C11.

The invention claimed is:

1. A method performed by a secondary user equipment (UE), the method comprising:
   determining a transmission activity of a primary UE on a configured grant (CG) resource that is shared by the primary UE and the secondary UE; and
   transmitting data on the CG resource after determining that the primary UE will not transmit or is not transmitting data on the CG resource, wherein determining that the primary UE will not transmit data on the CG resource comprises:
   monitoring a physical uplink control channel (PUCCH) resource configured for scheduling request (SR) transmission;
   determining that the primary UE has not transmitted an SR;
   determining if no further secondary UE having a priority higher than the priority of the secondary UE has transmitted an SR; and
   transmitting data on the CG resource in the affirmative.

2. The method of claim 1, wherein determining that the primary UE will not transmit data on the CG resource comprises receiving a communication from the primary UE.

3. The method of claim 1, wherein determining that the primary UE will not transmit data on the CG resource comprises performing handshaking and/or negotiations with the primary UE.

4. The method of claim 1, wherein determining that the primary UE will not transmit data on the CG resource comprises receiving from the primary UE a permission to transmit data on the CG resource in the next transmission occasion (TO).

5. The method of claim 1, wherein determining that the primary UE will not transmit data on the CG resource comprises receiving from the primary UE an indication that the primary UE will not transmit data on the CG resource in the next TO.

6. The method of claim 5, wherein the indication that the primary UE will not transmit data on the CG resource in the next TO is being determined from a buffer status report (BSR) of the primary UE being received as part of a broadcast or a multicast from the primary UE.

7. The method of claim 5, wherein the indication that the primary UE will not transmit data on the CG resource in the next TO indicates that the CG resource will not be occupied by the primary UE for a certain time.

8. The method of claim 1, further comprising transmitting an SR prior to transmitting data on the CG resource.

9. The method of claim 1, wherein determining that the primary UE is not transmitting data on the CG resource comprises performing a sensing of a transmission activity of the primary UE on the CG resource.

10. The method of claim 9, wherein performing the sensing comprises performing a listen before transmission (LBT) procedure or clear channel assessment (CCA).

11. The method of claim 9, wherein in case that the secondary UE detects that the primary UE is not transmitting data on the CG, the secondary UE transmits data on the CG resource after a certain offset with respect to a beginning of a TO.

12. The method of claim 11, wherein the CG resource is shared by the primary UE, the secondary UE, and a further secondary UE, wherein the secondary UE and the further secondary UE have different priorities, and wherein the certain offset for each of the secondary and the further secondary UE is dependent on the associated priority.

13. The method of claim 11, wherein the secondary UE performs a rate matching a transport block to be transmitted on the CG resource in order to compensate for symbols lost for the sensing process.

14. A secondary user equipment (UE), adapted to:

determine a transmission activity of a primary UE on a configured grant (CG) resource that is shared by the primary UE and the secondary UE; and transmit data on the CG after determining that the primary UE will not transmit or is not transmitting data on the CG resource, wherein determining that the primary UE will not transmit data on the CG resource comprises:

monitor a physical uplink control channel (PUCCH) resource configured for scheduling request (SR) transmission;

determine that the primary UE has not transmitted an SR;

determine if no further secondary UE having a priority higher than the priority of the secondary UE has transmitted an SR; and transmit data on the CG resource in the affirmative.

\* \* \* \* \*